(12) United States Patent
Frohnhaus et al.

(10) Patent No.: US 6,260,922 B1
(45) Date of Patent: Jul. 17, 2001

(54) VEHICLE SEAT WITH AN ADJUSTING DEVICE PROVIDED WITH A SPINDLE AND AN ASSOCIATED SPINDLE NUT

(76) Inventors: Ernst-Reiner Frohnhaus, Nettelbeckstrasse 4, D-42653 Solingen; Burckhard Becker, Obenkatternberg 25, D-42655 Solingen, both of (DE)

( * ) Notice: Subject to any disclaimer, the term of this patent is extended or adjusted under 35 U.S.C. 154(b) by 0 days.

(21) Appl. No.: 09/371,998

(22) Filed: Aug. 11, 1999

(30) Foreign Application Priority Data

Aug. 12, 1998 (DE) .............................. 198 36 424
Mar. 23, 1999 (DE) .............................. 199 12 978

(51) Int. Cl.[7] .................. B60N 2/02; B60N 2/04
(52) U.S. Cl. .................. 297/330; 248/424; 248/429
(58) Field of Search ............... 297/330; 248/424, 248/429

(56) References Cited

U.S. PATENT DOCUMENTS

| | | | |
|---|---|---|---|
| 4,645,159 | * | 2/1987 | Terada et al. ............... 248/429 |
| 4,802,374 | * | 2/1989 | Hamelin et al. ............ 248/429 X |
| 4,805,866 | * | 2/1989 | Aihara et al. ............... 248/429 |
| 4,838,511 | * | 6/1989 | Terada et al. ............... 248/429 |
| 5,150,872 | * | 9/1992 | Isomura ..................... 248/429 |
| 5,222,402 | * | 6/1993 | White et al. ................ 297/330 X |
| 5,259,257 | * | 11/1993 | Mouri ....................... 248/429 X |
| 5,273,242 | * | 12/1993 | Mouri et al. ............... 248/429 |
| 5,292,164 | * | 3/1994 | Rees ......................... 248/429 X |
| 5,314,158 | * | 5/1994 | Mouri ....................... 248/429 |
| 5,342,013 | * | 8/1994 | Ito et al. .................... 248/424 |
| 5,349,878 | * | 9/1994 | White et al. ................ 297/330 X |
| 5,823,499 | * | 10/1998 | Ito et al. .................... 248/429 |

* cited by examiner

*Primary Examiner*—Peter M. Cuomo
*Assistant Examiner*—Rodney B. White
(74) *Attorney, Agent, or Firm*—K. S. Cornaby

(57) ABSTRACT

The vehicle seat is equipped with an adjusting device having with a first adjusting element (20) and a second adjusting element (22). The adjusting device is particularly suited for a length-adjustment of an underframe relative to a seat. The adjusting device has a spindle (26) and an auxiliary spindle nut (30) encompassing the spindle (26). The spindle (26) is fastened onto the first adjusting element (20) of the adjusting device so as to rotate in unison with it and the spindle nut (30) a) is rotatably supported in the second adjusting element which is motion-linked with the first adjusting element (20) and b) is forming on its outer case a worm wheel that is engaged with a worm (32) which may be connected to a multi-turn actuation (36).

17 Claims, 2 Drawing Sheets

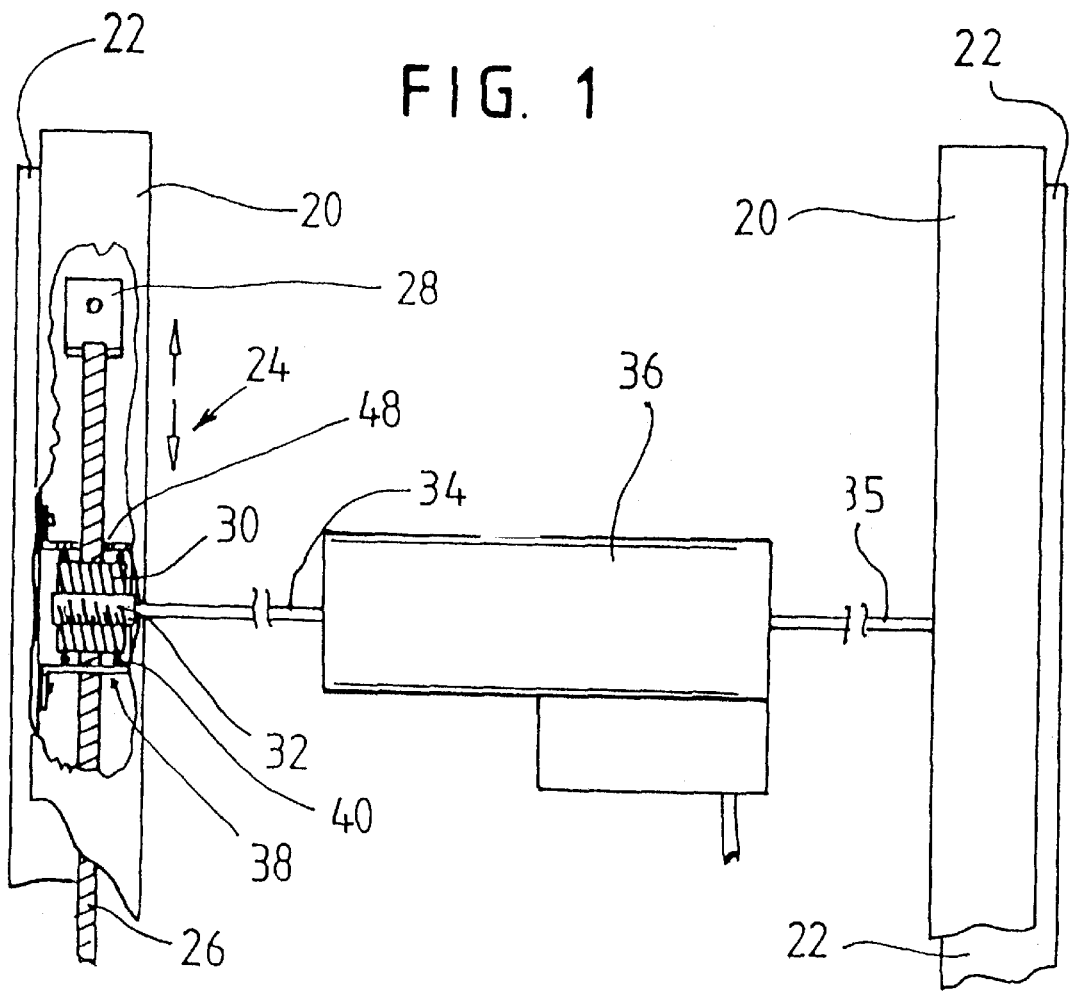
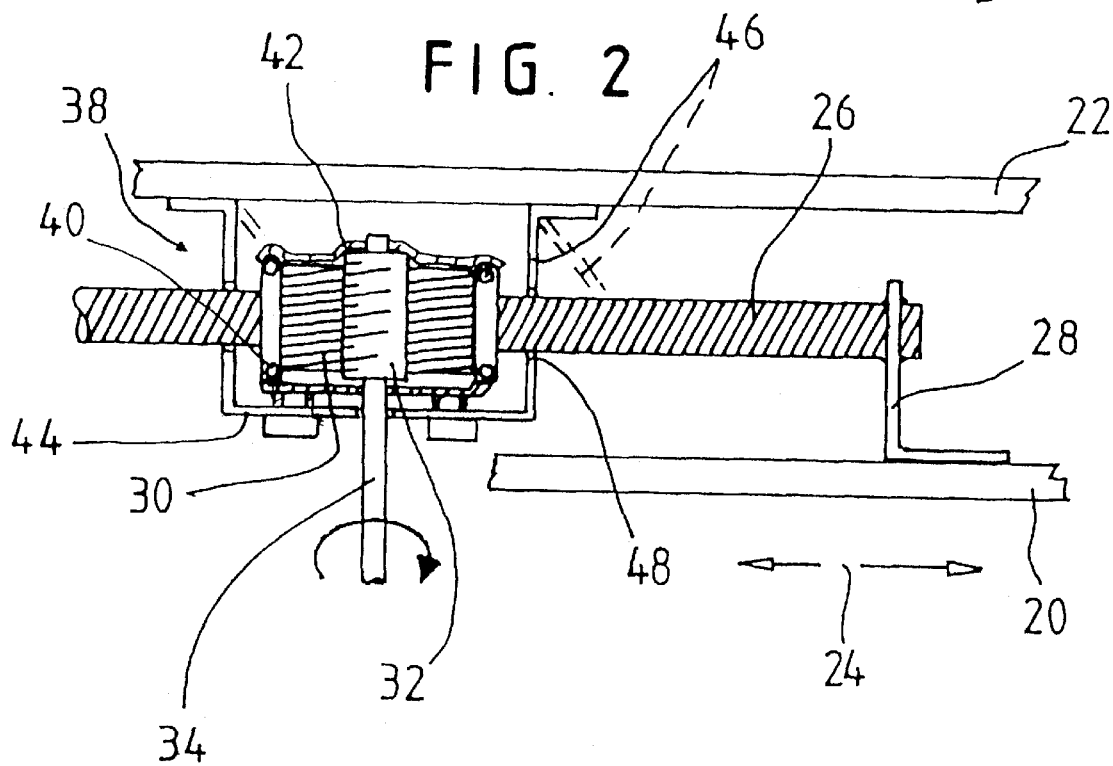

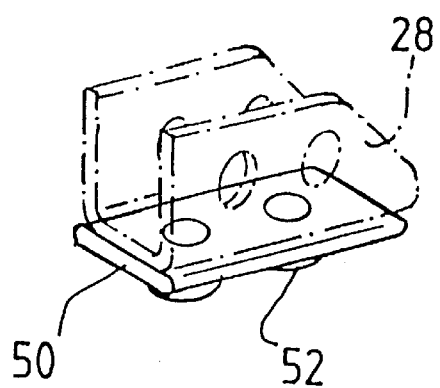
FIG. 3
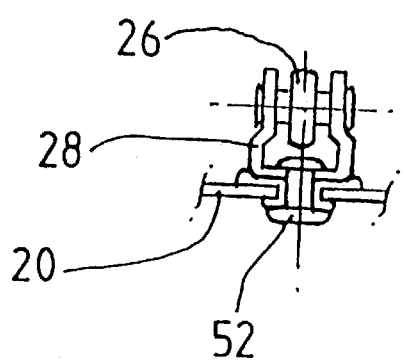
FIG. 4
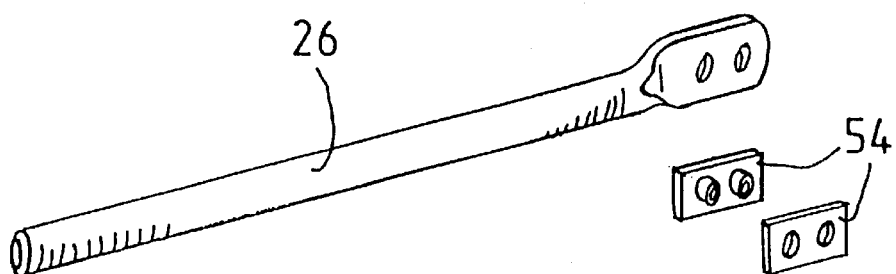
FIG. 5
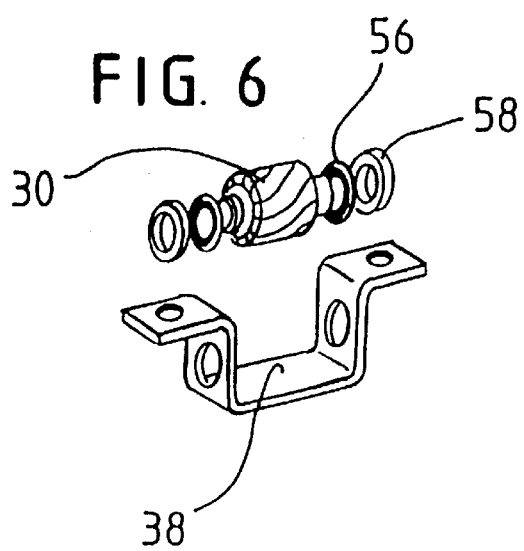
FIG. 6
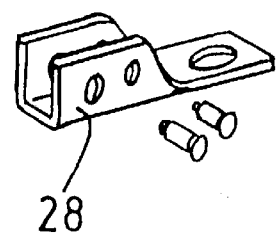

VEHICLE SEAT WITH AN ADJUSTING DEVICE PROVIDED WITH A SPINDLE AND AN ASSOCIATED SPINDLE NUT

The invention relates to a vehicle seat with an adjusting device provided with a first adjusting element and with a second adjusting element, particularly with a length-adjustment device for an underframe relative to a seat part. The adjusting device has a spindle and an auxiliary spindle nut encompassing the spindle. The spindle is associated to the first adjusting element of the adjusting device and the spindle nut is motion-linked with the second adjusting element.

Such adjusting devices for vehicle seats are well known. They are particularly suitable for being used with a multi-turn actuation designed as an electromotor. According to the state of the art, the spindle is multi-turn actuated. Several solutions are known to reduce or abolish the end play of the spindle nut relative to the spindle.

The adjusting devices of the type mentioned above have proved effective. The invention criticizes the pre-cited adjusting devices for being made of lots of component parts. The multi-turn actuation of the spindle by means of an electromotor entails that said electromotor has to be topped by a step-down gear with a high step-down ratio. The bearing of the spindle is not easy to realize, whereas the arrangement of the spindle nut in the second element is easy and does not make any problem.

On the basis thereof, the object of the present invention is to develop the adjusting device of a vehicle seat of the type mentioned above so that its constructive design is as easy as possible, that the adjusting device may be manufactured at low costs with simple means, that installing and servicing it is easy, that a complicated step-down gear may be omitted and that the multi-turn connection between the multi-turn actuation and the actual adjusting device may be designed in the easiest possible way.

The solution of this object is to give a vehicle seat an adjusting device having a first adjusting element and a second adjusting element, particularly a length-adjustment device for an underframe relative to a seat part, whereas the adjusting device has a spindle and an associated spindle nut encompassing the spindle and whereas the spindle is fastened onto the first adjusting element of the adjusting device so as to rotate in unison with it and the spindle nut a) is rotatably borne in the second adjusting element which is motion-linked with the first adjusting element and b) is forming on its outer case a worm wheel that is engaged with a worm which may be connected to a multi-turn actuation.

In the vehicle seat with an adjusting device according to the invention, the combination of worm and worm wheel on one side and of spindle nut and spindle on the other is forming the complete transmission. Thanks particularly to the worm and the worm wheel, a high stepping down is achieved. The multi-turn actuation may thus directly occur by means of an electromotor typically turning with 3000 revolutions per minute. Measures for a complicated step-down gear may thus be saved. The shaft connecting the multi-turn actuation with the worm wheel may be very simple since it turns with a relatively high number of revolutions, the torque to be transmitted being thus small. Accordingly, the shaft may have a small section and may be made of synthetic material for example. It preferably is a flexible shaft.

The firm arrangement of the spindle in the first adjusting element allows a very simple constructional design. Although the spindle nut has to be rotatably borne in the second adjusting element, easy solutions are available therefor. The whole arrangement may particularly be installed with relatively small measurements.

The invention makes it possible to install an adjusting device with very easy means so that it is light in weight, highly reliable, easy to design for locking in case of acceleration due to an accident and relatively easy to install and to service.

In a preferred embodiment of the invention, the spindle nut is arranged in a holder connected with the second adjusting part and provided with an opening for the spindle. The connection of this holder with the second adjusting part provides a radial spacing from the spindle. In case of an acceleration occurring between the first and the second adjusting element due to an accident, the spacing generates a force on the holder that strives to tilt it.

Thanks to the adequate size of the opening for the spindle, the edge of the holder's opening gets in touch with the thread of the spindle when the holder is bending due to an accident. The holder and the spindle are thus getting interlocked. The misplacement induced between the two adjusting elements by the forces generated by the accident is thus at least slowed down, normally it is hindered so much that it comes to a standstill.

In a preferred embodiment, the holder mentioned above has a base and two flanges projecting from said base. The opening for the free passage of the spindle is located in each flange. The two flanges are particularly parallel to one another. Such a holder allows the spindle nut to be received and borne in an easy way. It also has the above-mentioned advantages of interlocking in case of acceleration forces generated by an accident and acting upon the area between the first and the second adjusting element.

The holder is constructed so that, in case of an accident, it loses its shape under stress and occasions an additional interlocking. When not under stress due to an accident, the holder essentially keeps its shape and—if at all—is at least resilient. Thanks to the additional safety imparted by the holder, the spindle nut as well as the worm wheel may be made of synthetic material.

Further advantages and characteristics of the invention will become clear in the remaining claims and in the following description of embodiments that are only examples and are not limiting the scope of the invention. Said embodiments are explained in more detail with the aid of the drawing. It shows:

FIG. 1: a top view, sectional in parts, of an adjusting device for the length-adjustment of a vehicle seat of a vehicle relative to an underbody of a vehicle, FIG. 2: the sectioned part in the left area of FIG. 1 in a slightly different embodiment and enlarged, FIG. 3: a perspective view of a holding part for the fixation of a spindle on the first adjusting element, FIG. 4: a front view of a holding element that is connected with a first adjusting element and that is carrying a spindle, FIG. 5: a perspective assembly drawing for the fastening of a holding part on a spindle and FIG. 6: a perspective assembly drawing of a spindle nut with bearing parts and an auxiliary holder.

As may be seen in the figures, the adjusting device has a first adjusting element 20 designed here as a bottom rail of a couple of rails, said bottom rail being connectable with the underbody of the vehicle. The second adjusting element 22 is a seat rail which may be moved relative to said bottom rail and which is guided together with it, for example by being guided in it. The adjusting direction is shown by means of the double arrow 24.

The first adjusting element 20 is linked with a spindle 26 that is firmly arranged by its upper end in FIG. 1 via an angular holding part 28 on the first adjusting element 20. The other end of the spindle is preferably also fastened that way, but it may also be held in a yielding holding device, for example in a rubber block.

The spindle 26 is encompassed by a spindle nut 30. It is made of synthetic material. Its outer case constitutes a worm wheel. Said worm wheel is engaged with a worm 32. The worm is rotatably linked with an electromotor constituting here the multi-turn actuation via a shaft 34. This shaft 34 may be relatively small in section, it may for example be a plastic rod. Particularly appropriated shafts 34 are flexible shafts such as for example speedometer drives.

As may be seen in FIG. 1, the electromotor 36 also has a turning outlet on its other end too, in other words, its output shaft is traversing it axially. On the other side and coaxial with shaft 34, a shaft 35 of the same design is provided that actuates an adjusting device of the right seat side which is identical with the one of the left seat side, preferably of identical design.

The spindle nut 30 is rotatably arranged in a holder 38. Two ball bearings 40 are provided between the spindle nut 30 and the holder 38. As may particularly be seen in FIG. 3, the spindle nut 30 itself is accommodated in a cage 42 made of synthetic material, the ball bearings being arranged between the cage 42 and the spindle nut 30. The cage 42 is connected with the holder 38 by means of screws. Other designs are possible.

The holder 38 has a base 44 running essentially parallel to the first adjusting element 20 as well as two flanges 46 that are perpendicular to said base. The flanges have an U-bend by means of which they are each connected with the first adjusting element 20.

The flanges 46 are provided with openings 48 for the free passage of the spindle 26. They have a clear diameter being slightly bigger than the outer diameter of the spindle 26. These openings are not noticeable during normal operation. In case of an accident, when a misplacement force is generated between the two adjusting elements 20, 22, the spindle nut 30 is entraining its auxiliary holder 38, the holder is slanting, as it is hinted at by the dashed line in FIG. 2, see flange 46. The edges of the opening 48 are thus getting in touch with the screw threads of the spindle 26 and a mechanical engagement is taking place. A further motion between the two adjusting elements 20, 22 due to an accident is generally slowed down so much that it comes to an end.

The embodiments according to the FIGS. 3 and 6 are allowing a silencing during the activity of the adjusting device. A principle of solution is always realized in these embodiments: the parts which are directly actuated and those directly participating in the actuation are not directly connected with their associated parts but are connected with them by the insertion of absorption members leading to silencing and to a reduction of the oscillations. The parts mentioned are for example the spindle 26, its holding part 28 and the spindle nut 30. These parts are always mounted and held in such a way that they are not in direct contact with the parts to which they are adjacent and by which they are maintained. An attenuating member of synthetic material or of elastomers is always placed in-between. In other words, these parts are isolated from the parts to which they are fastened by distance pieces so that the distance piece is preventing a direct contact. It is the same procedure as with electric insulation.

In the embodiment according to FIG. 3, the illustrated holding part 28 replacing the angle 28 of the embodiment according to FIGS. 1 and 2 has a bottom plate 50 made of an elastomer. This bottom plate 50 is silencing the holding part 28 relative to the first adjusting element 20 onto which the bottom plate 50 is fastened. In order to avoid a contact between the holding part 28 and the first adjusting element 20 via fastening means such as screws, rivets or the like, the fastening means are also coated with elastomer sleeves, rings or bushes. This will be explained in more detail in the description of the FIGS. 4 and 5.

FIG. 4 shows another design of the holding part 28 that is directly connected with the spindle 26. In this case, an attenuation member 52 made of an elastomer and designed as a sleeve having a peripheral indentation is provided, said attenuation member noise (and electrically) separating the holding part 28 made of metal together with the rivets being in direct touch with it from the first adjusting element 20. Sound transmission from the holding part 28 to the first adjusting element 20 is thus considerably reduced.

FIG. 5 shows how the mechanical connection between the one end of the spindle 26 and the holding part 28 may be designed so that as little noise as possible may be transmitted directly onto the holding part 28. Again, the connection is not made directly between the spindle 26 and the holding part 28 but is achieved by inserting between the spindle and holding part absorption members 54 made of elastomer, synthetic material or the like. The flat end of the spindle 26 has two borings. The absorption members are composed of two perforated plates, whereas the perforation corresponds to the borings, and of short pieces of tube which are preferably connected with one of the absorption members 54. They are needed to completely isolate the pin-like fastening means from the spindle 26 by passing through the holes of the spindle 26 and preventing a direct contact between these pins and the spindle 26.

The embodiment according to FIG. 6 shows the bearing of the spindle nut 30. The essentially cylindrical spindle nut is provided on its two axial ends with bearing necks being integral part of it. Rings 56, for example rubber rings, are first of all slid onto these bearing necks, consequently ball bearings 58 are following. Just as the complete spindle nut 30, the bearing necks are hollow or are provided with an internal screw thread in order to let through the spindle 26, are slit radially and are having a peripheral cavity. The ball bearings 58 that are ring-shaped are clicking into said cavity. Each time, the one ring 56 also becomes fastened. The ring is compensating tolerances and is also attenuating noises. The ball bearings 58 are now fastened onto the holder 38 in the way already described for the embodiment according to the FIGS. 1 and 2.

The embodiment according to the FIGS. 3 to 6 shows individual solutions for an acoustical isolation of parts connected to the actuation from other parts. The practical realization of the invention combines the solutions so that for example the solution according to FIGS. 3 or 4 is combined with the solution according to FIG. 5 and the solution according to FIG. 6.

The embodiments according to the FIGS. 3 to 6 are preventing solid-borne noise generated by parts being directly in mechanical touch with the electromotor 36 or with parts directly actuated by said electromotor from being transmitted to other parts. Thanks to attenuation means 50 to 56, the transmission of solid-borne noise from one part to the other is considerably attenuated. The material used for the attenuation means has to have enough mechanical solidity and its acoustical impedance should be as different as possible from the parts located on either side of the attenuation means. The transmission of the acoustic waves from the spindle 26 to the holding part 28 for example is thus considerably disturbed, since on the contact surfaces to the attenuation means the sound waves are reflected and are hardly penetrating.

What is claimed is:

1. Vehicle seat with an adjusting device for adjusting said vehicle seat, said adjusting device comprising a first adjusting element and a second adjusting element, said adjusting device further comprising a threaded spindle and a spindle nut in mesh with said threaded spindle, wherein said threaded spindle is fastened onto said first adjusting element so that said threaded spindle cannot rotate relative to said first adjusting element and said spindle nut a) is rotatably supported in said second adjusting element, so that said spindle nut can be rotated but cannot be displaced relative to said second adjusting element and b) has the outer case and is forming on said outer case a toothed worm wheel, said toothed worm wheel is in mesh with a worm, said worm is rotatably connected to a motor.

2. Vehicle seat according to claim 1, wherein said spindle nut is arranged in a holder connected with said second adjusting element, said holder is provided with an opening for said threaded spindle, said holder is connected with said second adjusting element in a connecting area, said connecting area is radially spaced from said threaded spindle.

3. Vehicle seat according to claim 2, wherein an attenuation member is arranged between one end of said threaded spindle and said holder, a direct contact between said holder and said threaded spindle being excluded and is not even taking place via fastening means.

4. Vehicle seat according to claim 2, wherein said holder is connected with said first adjusting element by inserting an attenuation means between said holder and said first adjusting means so that no direct mechanical contact is possible between said holder and said first adjusting element, not even via fastening means.

5. Vehicle seat according to claim 2, wherein said spindle nut has axial bearings onto which a ball bearing may be clipped, a ring is provided between said ball bearing and an axially adjacent radial surface of said spindle nut, said ring being made of an elastomer material.

6. Vehicle seat according to claim 2, wherein said holder is U-shaped, and has a base and two flanges, said flanges being provided each with an opening for a free passage of said threaded spindle.

7. Vehicle seat according to claim 6, wherein said holder has ends of said flanges and is connected by said ends with said second adjusting element.

8. Vehicle seat according to claim 7, wherein said ends have an angle running parallel to said base and serve for fixation.

9. Vehicle seat according to claim 1, wherein said holder has a normal shape and is mechanically designed so that it loses its normal shape when said adjusting device is put under a stress which is due to a traffic accident but that said holder essentially keeps its normal shape and/or is at least resilient under a stress lying below said stress generated by a traffic accident.

10. Vehicle seat according to claim 1, wherein said spindle nut is made of synthetic material.

11. Vehicle seat according to claim 1, wherein said worm has a rotational axis running oblique to an axis of said threaded spindle, said worm further having a connected means, said connecting means is adapted to be connected directly with an electromotor.

12. Vehicle seat according to claim 1, wherein said threaded spindle is made of metal.

13. Vehicle seat according to claim 1, wherein said vehicle seat has a) two adjusting devices and b) a left seat side and a right seat side, said left seat side has one of said two adjusting devices and said right seat side has one of said two adjusting devices, said motor is an electromotor which electromotor has two opposite ends and has an output shaft on each of said opposite ends, said output shaft on one of said two opposite ends is connected with said adjusting device of said vehicle seat for said left seat side and said output shaft on said other of said two opposite ends is connected with said adjusting device of said vehicle seat for said right seat side.

14. Vehicle seat according to claim 1, wherein said motor is turning with a number of revolutions that is higher than one of 1000 revolutions per minute.

15. Vehicle seat according to claim 1, wherein said threaded spindle has two ends and is only held by one of said two ends in a holding part, the other of said two ends is free.

16. Vehicle seat according to claim 1, wherein said adjusting device is a length-adjustment device for an underframe relative to a seat part.

17. Vehicle seat according to claim 1, wherein said threaded spindle has two ends and is only held by one of said two ends in a holding block, the other of said two ends is supported in an elastomer block that absorbs vibrations.

* * * * *